J. J. MARCY.
Lanterns.
No. 167,108. Patented Aug. 24, 1875.
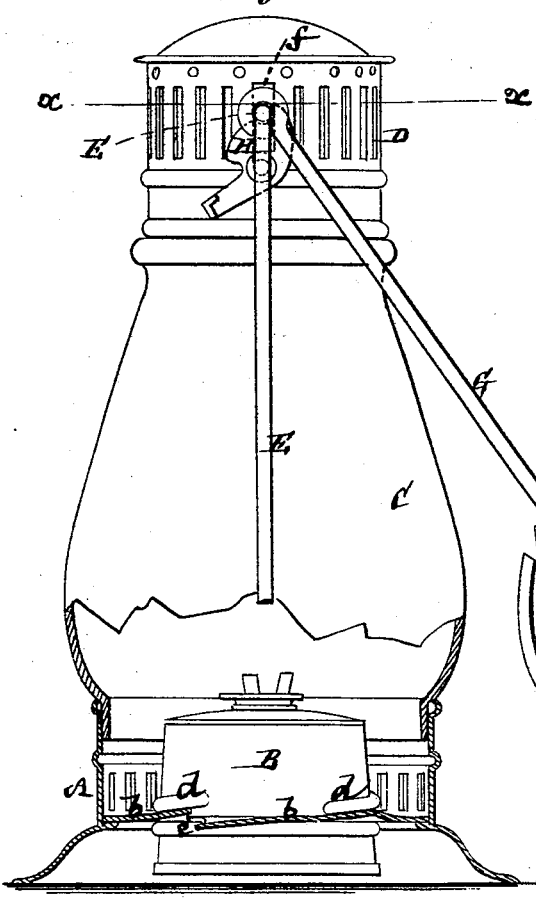
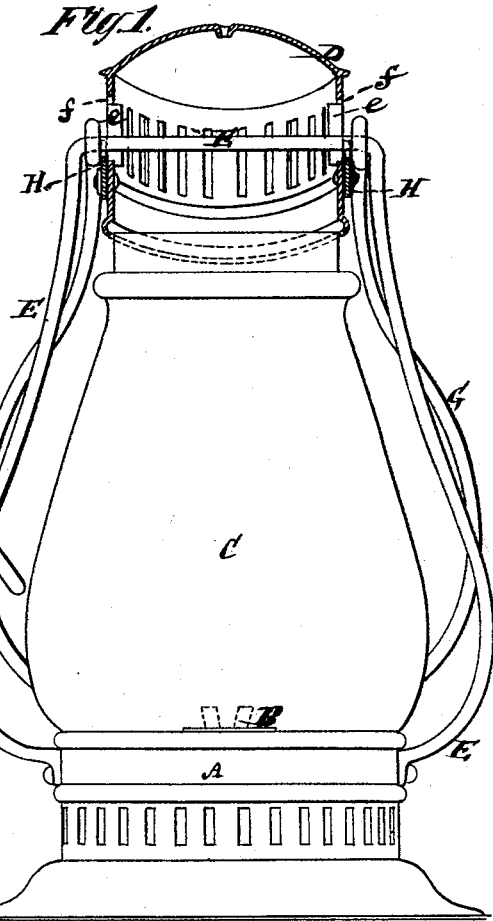
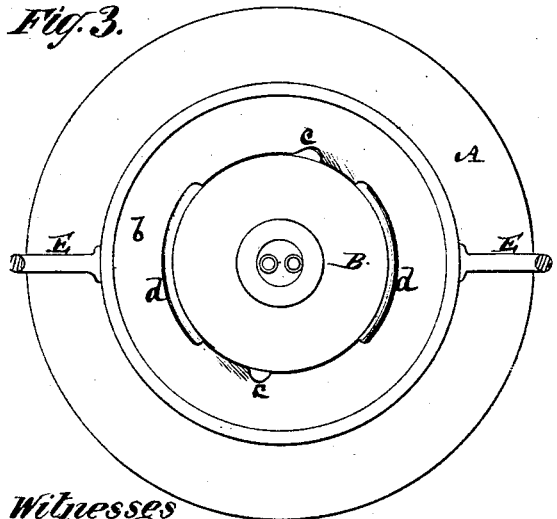
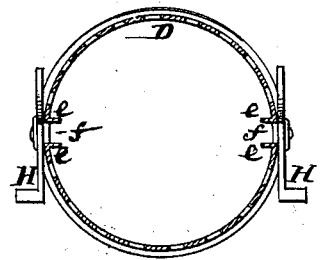

UNITED STATES PATENT OFFICE.

JOHN J. MARCY, OF BRIDGEPORT, CONNECTICUT, ASSIGNOR TO BRIDGEPORT BRASS COMPANY, OF SAME PLACE.

IMPROVEMENT IN LANTERNS.

Specification forming part of Letters Patent No. 167,108, dated August 24, 1875; application filed July 24, 1875.

*To all whom it may concern:*

Be it known that I, JOHN J. MARCY, of Bridgeport, in the county of Fairfield and State of Connecticut, have invented certain new and useful Improvements in Lanterns; and I do hereby declare that the following is a full, clear, and exact description of the same, reference being had to the accompanying drawing, which forms part of this specification.

This invention relates in part to means of securing the lantern cap or top to or in connection with the frame of the lantern, to facilitate the removal and replacement of the globe or shade.

The invention consists in a novel combination of independent cam-fastenings, pivoted to the removable lantern cap or top, a yoke-shaped bar or frame secured to the base of the lantern, and upright side openings in said cap or top, through which said yoke passes. This forms a simple, cheap, ready, and secure means of holding and removing the lantern cap or top, for the purpose of securing and removing the shade, without any liability of said cap or top becoming detached from the frame, or of the latter dropping out of place. Furthermore, it is proposed to make the upright slots or openings in the sides of the cap, through which the top bar of the yoke-shaped frame passes, by simply slitting the metal of the cap or top, and turning in the edges, whereby not only the cap or top is strengthened, but a broad bearing or guiding surface is provided for the movement of the cap on the cross or top bar of the frame to secure or release the cap, as required.

Figure 1 represents a side elevation of a lantern, having its cap or top in section, and raised and tipped to facilitate the entry or removal of the shade. Fig. 2 is a further side elevation, at right angles to Fig. 1, showing the cap or top as secured to its place when down, and with the lower part of the lantern broken through the flange which carries the lamp. Fig. 3 is a plan of the base portion of the lantern, with lamp secured therein; and Fig. 4, an upper transverse section on the line $x\,x$.

A is the base of the lantern, constructed with an inwardly-projecting flange, $b$, which is provided with one or more notches, $c$, the edges of which are suitably turned or bent, to allow of the introduction within or through them of the ends of worms or partial screw-threads $d$, formed on the body of the lamp B, to provide for the ready attachment and detachment of the lamp from the lantern. C is the lantern shade or globe, and D the lantern cap or top. E is a bar or yoke-shaped frame, secured below to the base A, and crossing by an upper bar through opposite upright slots or openings $f\,f$ in the cap or top D.

When it is necessary to introduce or remove the shade C, the cap or top D is permitted, by means of the slots $f\,f$, through which the cross or upper bar of the yoke-frame E passes, to move upward, and is slightly tipped or tilted around said cross-bar.

To give a broad or steady bearing and guiding surface for the cap D on the cross-bar of the yoke-frame E, the opposite side slots $f\,f$ are formed by simply slitting the metal of the cap at such part, and turning in the edges of the slits to form wings $e\,e$, which also serve to stiffen the cap or top D.

G is the bail or swinging handle by which the lantern is carried, and which is in hooked or looped connection with the cross-bar of the yoke-frame E, outside of the cap or top D. The cap or top D is secured to its place to hold the shade C in position, and to allow of its removal, when required, by means of cams H H, pivoted to the sides of the cap or top, and constructed to hook with a binding action or effect under the ends of the upper cross-bar or portion of the yoke-frame E inside of the bail G, and which, when turned down and released, readily admit of the cap or top D being raised and tilted, as required, to admit of the introduction or removal of the shade C, but which, when turned to lock on the upper cross-bar of the yoke-frame E, effectualy prevent any accidental disturbance of the cap or top D.

I claim—

1. The combination, substantially as hereinbefore set forth, of the independent cam-fastenings H, pivoted to the removable lantern-cap S, the yoke-shaped frame E, secured to the base of the lantern, and passing through vertical elongated openings or slots $f$ in the cap of the lantern, as and for the purpose described.

2. The slots $f\,f$, formed by slitting the metal of the cap or top D, and turning in the edges, to constitute inwardly-projecting wings $e\,e$, in combination with the upper cross-bar of the yoke-frame E, essentially as described.

JOHN J. MARCY.

Witnesses:
  ISAAC E. OSBORN,
  F. A. TISCHENDORF.